(12) United States Patent
Blair (10) Patent No.: US 9,114,999 B2
(45) Date of Patent: Aug. 25, 2015

(54) OXIDIZED GRAPHITE AND CARBON FIBER

(75) Inventor: Richard G. Blair, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 13/882,326

(22) PCT Filed: Oct. 28, 2011

(86) PCT No.: PCT/US2011/058309
§ 371 (c)(1),
(2), (4) Date: Jul. 22, 2013

(87) PCT Pub. No.: WO2012/058553
PCT Pub. Date: May 3, 2012

(65) Prior Publication Data
US 2013/0330477 A1    Dec. 12, 2013

Related U.S. Application Data (60) Provisional application No. 61/514,981, filed on Aug. 4, 2011, provisional application No. 61/407,696, filed on Oct. 28, 2010.

(51) Int. Cl.
| | | |
|---|---|---|
| C01B 31/04 | (2006.01) |
| C09D 5/24 | (2006.01) |
| D01F 8/18 | (2006.01) |
| D01F 9/14 | (2006.01) |
| D06M 11/74 | (2006.01) |
| C09D 1/00 | (2006.01) |

(Continued)

(52) U.S. Cl.
CPC .............. *C01B 31/0446* (2013.01); *B82Y 30/00* (2013.01); *B82Y 40/00* (2013.01); *C01B 31/043* (2013.01); *C01B 31/0438* (2013.01); *C01B 31/0476* (2013.01); *C09D 1/00* (2013.01); *C09D 5/24* (2013.01); *D01F 8/18* (2013.01); *D01F 9/14* (2013.01); *D06M 11/74* (2013.01)

(58) Field of Classification Search
None
See application file for complete search history.

(56) References Cited

U.S. PATENT DOCUMENTS 5,112,654 A  *  5/1992  Claar ........................ 427/376.6
6,713,435 B2    3/2004  Katsuki et al.

(Continued)

FOREIGN PATENT DOCUMENTS

| KR | 20100099586 A | | 9/2010 |
| WO | WO 2009/049375 | * | 4/2009 |
| WO | 2010085444 A1 | | 7/2010 |

OTHER PUBLICATIONS

Kovtyukhova et al, JACS, 125, pp. 9761-9769, 2003.*

(Continued)

*Primary Examiner* — Erma Cameron
(74) *Attorney, Agent, or Firm* — Timothy H. Van Dyke; Beusse, Wolter, Sanks & Maire, PLLC (57) ABSTRACT

A mechanochemical oxidation process that allows relatively benign oxidizers to be used for the production of at least partially oxidized graphite, and a method of preparing a carbon fiber using oxidized graphite and a fiber component. Partially oxidized graphite is fully dispersible in water and can be used to prepare thin films with conductivities rivaling pure graphite. This offers the potential for improved electronic displays, solar cells, and lithium ion batteries. A carbon nanotube and a method of making the same is also provided.

13 Claims, 6 Drawing Sheets

(51) Int. Cl.
*B82Y 30/00* (2011.01)
*B82Y 40/00* (2011.01)

(56) References Cited

U.S. PATENT DOCUMENTS

| | | | |
|---|---|---|---|
| 2003/0044602 A1 | 3/2003 | Yanagisawa et al. | |
| 2007/0092432 A1* | 4/2007 | Prud'Homme et al. | 423/448 |
| 2007/0131915 A1* | 6/2007 | Stankovich et al. | 252/511 |
| 2008/0258359 A1* | 10/2008 | Zhamu et al. | 264/673 |
| 2008/0279756 A1* | 11/2008 | Zhamu et al. | 423/448 |
| 2009/0087638 A1 | 4/2009 | Shan et al. | |
| 2010/0105834 A1* | 4/2010 | Tour et al. | 525/50 |

OTHER PUBLICATIONS

Rasor, N.S. et al., "Thermal properties of graphite, molybdenum and tantalum to their destruction temperatures", Journal of Physics and Chemistry of Solids, 1960, vol. 15, pp. 17-26, abstract only.

Hamwi, A et al., "Some chemical and electrochemical properties of graphite oxide", Journal of Physics and Chemistry of Solids, 57(6-8), pp. 867-876, 1996.

He, H. et al., "A new structural model for graphite oxide", Chemical Physics Letters, 1998, 287(1-2), pp. 53-56.

Lerf, A et al., "Structure of Graphite Oxide Revisited", The journal of Physical Chemistry B, 1998, 102(23), pp. 4477-4482.

Stankovich, S. et al., "Graphene-based composite materials", Nature, 2006, 442(7100), pp. 282-286.

Dikin, D.A. et al., "Preparation and characterization of graphene oxide paper", Nature 2007, 448(7152), pp. 457-460.

Stankovich, S et al., "Synthesis of graphene-based nanosheets via chemical reduction of exfoliated graphite oxide", Carbon, 2007, 45(7), pp. 1558-1565.

Geim, A.K., "The rise of graphene", Nature Materials, 2007, 6(3), p. 183.

Hummers, W.S. et al., "Preparation of Graphitic Oxide", Journal of the American Chemical Society, 1958, 80(6), p. 1339.

Marcano, D.C. et al., "Improved Synthesis of Graphene Oxide", ACS Nano, 2010 4(8), pp. 4806-4814.

Varma, R.S. et al., "The Ureaa Hydrogen Peroxide Complex: Solid-State Oxidative Protocols for Hydroxylated Aldehydes and Ketones (Dakin Reaction), Nitriles, Sulfides, and Nitrogen Heterocycles", Organic Letters, 1999, 1(2), pp. 189-192.

Zielinska, A et al., "A solvent-free synthesis of (dichloroiodo) arenes from iodoarenes", Tetrahedron Letters, 2004, 45 (5), pp. 1087-1089.

Benjamin C. Brodie, "On the Atomic Weight of Graphite", Proceedings of the Royal Society of London, 1859, vol. 10, p. 249.

Shen, J. et al., "Fast and Facile Preparation of Graphene Oxide and Reduced Graphene Oxide Nanoplatelets", Chem. Mater, 2009, vol. 21, pp. 3514-3520.

* cited by examiner

OXIDIZED GRAPHITE AND CARBON FIBER

RELATED APPLICATIONS

This application claims priority to U.S. Ser. No. 61/407,696, filed Oct. 28, 2010, and U.S. Ser. No. 61/514,981, filed Aug. 4, 2011.

BACKGROUND

Graphite is an allotrope of carbon in which the atoms are arranged in large sheets of fused six member rings. Single sheets of carbon that make up graphite are known as graphene or graphene sheets. Graphene is a flat monolayer of carbon atoms tightly packed into a two-dimensional (2D) honeycomb lattice, and is a building block for graphitic materials of all other dimensionalities. Graphene or graphene sheets are the single sheets of carbon that make up graphite, i.e., is graphite in a layered form.

Graphite has many useful properties including a low coefficient of friction, good electrical conductivity, and high thermal resistance [1]. Graphite does not, however, interact well with water, as it is insoluble and difficult to suspend. Graphite oxide, on the other hand, contains oxygen attached to the layers as epoxy bridges and hydroxyl groups [2-4]. The properties of graphite oxide differ significantly from graphite, for example, graphite oxide is an electrical insulator and thermally decomposes. Graphite oxide is also significantly more hydrophilic than graphite, providing complete exfoliation upon suspension in water [2, 4-6].

Graphite oxide ($C_2O$) was synthesized as early as 1860 by Benjamin C. Brodie by treating graphite with a mixture of potassium chloride and fuming nitric acid [14]. Hummers and Offeman later developed a quicker, safer method of preparing graphite oxide than that which was used by Brodie, later termed "Hummer's method". Graphite oxide is most commonly produced using Hummers method, which includes using a mixture of sulfuric acid ($H_2SO_4$), sulfuric nitrate ($NaNO_3$), and potassium permanganate ($KMnO_4$) [15]. Unfortunately, these methods of graphite oxide synthesis require large amounts of concentrated acid, powerful oxidizers, and can result in the generation of toxic byproducts [9]. In using these methods, 26 liters of acidic manganese-containing waste is produced for every 180 grams of product prepared. If the manganese by-products are not carefully removed, the material produced is highly pyrophoric.

Consequently, what is needed is scalable, industrially relevant quantities of oxidized graphite without the generation of acidic or metal-containing waste. However, in view of the prior art considered as a whole at the time the present invention was made, it was not obvious to those of ordinary skill in the art how the limitations of the art could be overcome.

SUMMARY

This invention, at least in part, relates to a method of producing industrially relevant quantities of oxidized graphite, as well as partially oxidized graphite. The invention also relates, in part, to the production of graphene using graphite oxide. Furthermore, the invention pertains to the use of oxidized graphite in the production of carbon fibers and carbon nanotubes from fiber and other components.

The long-standing but heretofore unfulfilled need for scalable, industrially relevant quantities of oxidized graphite without the generation of acidic or metal-containing waste is now met by a new, useful, and nonobvious invention. Furthermore, the need for low-cost production of carbon fibers without the loss of the necessary mechanical properties is satisfied by certain embodiments of the subject invention.

It has now been realized that the ability of oxidized graphite to exfoliate in water makes it a valuable precursor in the synthesis of single sheets of graphene, which in turn can be used for a variety of electronic and materials applications. After exfoliation, the sheets of oxidized graphite can be chemically reduced into graphene [7]. Graphene synthesis is a very important process due to the unique properties of graphene and the growing interest and vast potential of graphene [8].

There are currently two approaches to produce graphene, by chemical vapor deposition or by heat treatment of oxidized graphite. For displays, such as touch-screen displays, graphene is produced by growing a layer on a copper film and chemically etching the copper away. This method is cumbersome and produces a large amount of waste. Alternatively, graphene can be produced by suspending oxidized graphite in water and depositing it as thin films. These thin films can be heat treated in contact with a reducing agent such as hydrogen or hydrazine to produce films of graphene.

According to one embodiment, the invention pertains to a method of producing oxidized graphite which includes the step of milling graphite powder in the presence of a solid oxidizing agent.

According to another embodiment, the invention pertains to a new implementation of oxidized graphite, i.e., the formation of a new carbon fiber. In a more specific embodiment, the method includes the introduction of a fiber component into a colloidal suspension of oxidized graphite in order to form a fiber coated in sheets of functionalized graphene. Pyrolisis of the graphene under a reducing atmosphere results in a carbon fiber with a sheath of graphite which exhibits enhanced mechanical properties and increased conductivity. In one example, the reducing atmosphere may be hydrogen. Carbon fiber is characterized by having excellent tensile strength, stable electrical properties, and high chemical resistance, in addition to a high resistance to heat; the manufacturing method thereof is economical.

BRIEF DESCRIPTION OF THE DRAWINGS

For a fuller understanding, reference should be made to the following detailed description, taken in connection with the accompanying drawings, in which.

DETAILED DESCRIPTION

Considering the significant problems with existing methods of graphite oxide synthesis, it is highly desirable to develop a new, more efficient synthetic method. Recent studies have focused on the improvements which can be made by relatively minor modifications to Hummers method [10, 11].

Figure 1:
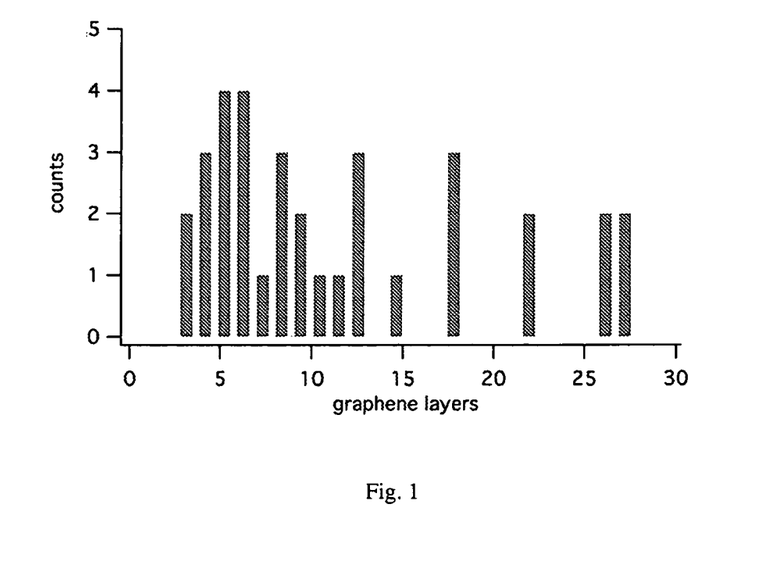
FIG. 1 is a thickness distribution of graphene sheets.

High-energy ball milling can be used to produce partially oxidized graphite. By directly milling graphite powder with a solid oxidizing agent, graphite is oxidized without the need for concentrated acid, or any type of solvent. Several solid oxidizing agents were investigated, and urea hydrogen peroxide adduct (UHP) was determined to be the most effective. UHP has some history of use for solvent free and non-aqueous reactions, because it provides an anhydrous, solid delivery system for $H_2O_2$ [12, 13]. UHP is also valued for its mild nature in comparison to the oxidizing agents used in current synthetic methods. The optimum parameters for oxidizing graphite with UHP and varying degrees of oxidation were identified herein. Oxidized graphites with oxygen content from about 5 to about 15% mass were produced. This is equivalent to compositions ranging from about $C_{25}O$ to about $C_7O$. The partially oxidized material retains much of the electrical conductivity of graphite and is hydrophilic. This dispersible material consists of large graphene sheets approximately 3-10 layers thick, as show in FIG. 1.

Aside from the potential to generate completely oxidized graphite, generating partially oxidized graphite has its own value. Partial oxidation can allow graphite to retain some of its properties while taking on certain properties of graphite oxide. This discovery is particularly useful for applications of graphite that include the deposition of a film or use of colloidal graphite. These applications are difficult to achieve with graphite, because as aforementioned, suspension of graphite in a solvent can be challenging. One particularly significant benefit of oxidized graphite mentioned above is that it is hydrophilic, and therefore fully dispersible in water.

Carbon fiber is a material consisting of extremely thin fibers and typically composed mostly of carbon atoms. The carbon atoms are bonded together in microscopic crystals that are more or less aligned parallel to the long axis of the fiber. The crystal alignment makes the fiber very strong for its size. Current approaches to the preparation of carbon fibers use polyacrylonitrile (PAN) as a precursor. As of 2010, PAN contributes $5/lb or about 50% to the cost of carbon fibers ($9.88/lb). Utilization of a feedstock with a lower cost will increase the profitability of carbon fibers and facilitate their use in low-cost applications such as structural components for vehicles.

Therefore, a need exists for a low-cost method of producing carbon fibers which exhibit enhanced mechanical properties.

EXAMPLES

Reagents:

Graphite (Asbury carbons TC306 grade 99.92% and 146 grade 96.86%) and Urea Hydrogen Peroxide Adduct (Alfa Aesar, 97%, Across Organics) were the primary reagents for the preparation of graphite oxide. Also investigated as solid oxidizing agents were $KMnO_4$ (J.T. Baker Chemical Co.), $ZnO_2$ (Alfa Aesar 50%), and $CaO_2$ (Alfa Aesar 65%). Acetone (Mallinckrodt 99.5%), methanol (Mallinckrodt 99.8%), and absolute ethanol (Pharmco-Aaper) were all utilized in processing the reaction mixture between steps.

Milling:

Small scale milling experiments were performed in 8000M and 8000D SPEX Certiprep mixer/mills. Milling vials were constructed from 440C stainless steel with an approximate volume of 65 mL. Viton and quad o-rings were used to maintain a seal during milling. High kinetic energy milling was performed with three about 0.5" stainless steel balls weighing approximately 8 g each Milling was carried out in about 30-minute increments, followed by about 30 minutes of cooling to reduce wear on the mill's motor.

Large Scale milling experiments were performed in a Fritsch Pulverisette 6 planetary ball mill Milling vials were constructed of X10CrNiS18-9 stainless steel with an approximate volume of 250 mL. A Viton gasket was used to maintain a seal during milling. Milling was performed with about 45 0.5" stainless steel balls weighing about 8 g each. Milling was carried out in about 60 minute increments with approximately 30 minutes of cooling between each increment.

Procedure:

The oxidized graphite was prepared by milling graphite with stoichiometric amounts of UHP according to the theoretical maximum oxygen content of $C_2O$. About one (1) gram of graphite was milled stepwise with portions of the total UHP in order to prevent buildup of urea and $H_2O$ from inhibiting the reaction. Between steps, approximately 40 mL of solvent was added to the vial and milled for about one (1) minute to suspend the reaction mixture in the solvent. This suspension was then transferred to a centrifuge tube and centrifuged for approximately 10 minutes at approximately 10,000 RPM. The solvent, containing with it the large majority of any urea or $H_2O$ present was decanted off, and the remaining solid (partially oxidized graphite) was left to dry. Once completely dry, the solid was transferred back in the vial, where it was then milled with the next portion of UHP. Once the desired amount of UHP had been reacted, the powder was suspended in water and placed in dialysis tubing left soaking in deionized water to isolate the graphite oxide product. After a few days in the dialysis tubing, the sample was removed and dried by rotary evaporation.

At any phase of the milling process, it is possible to remove a small amount of the reaction mixture and test it for the presence of peroxide by mixing it with water and adding a few drops of prepared luminal solution. If no fluorescence is observe, all of the UHP has reacted and further milling serves only to decompose the product. If fluorescence is observed, unreacted UHP is still present in the reaction mixture and further milling is still required.

The optimum procedure used methanol as a solvent, TC306 graphite, about 4 equal portions of UHP (about 1 gram each), which were milled for about 90, 60, 45, and 30 minutes as determined by testing with luminal for complete reaction.

Example 1

Milling stepwise followed by drying in an oven, results in an increased oxidation level. About 1.0171 g of graphite (TC306) was milled stepwise with about 5 portions of 0.7966 g of UHP (Alfa Aesar) for about 2 hours each. In between millings, the vial was opened and placed into an approximately 70° C. drying oven to evaporate any excess water. Once all the milling was complete, the solid was suspended in water and placed into dialysis tubing. After several days in a recirculating deionized water bath, the suspension was removed from the dialysis tubing and dried via rotary evaporation. The oxygen content was determined to be about 11.50%.

Example 2

Acetone can be used as an intermediate solvent to eliminate any heating that may result in degradation of the graphite oxide being produced. About 1.0171 g of graphite (TC306) was milled stepwise with about 3 portions of about 1.3276 g of UHP (Alfa Aesar) for about 2 hours each. In between millings, the vial was filled with approximately 40 mL acetone and milled for 1 minute to suspend the reaction mixture. This suspension was then transferred to a centrifuge tube and centrifuged at about 10,000 RPM for about 10 minutes. The solvent was then decanted off (the solid was allowed to dry) and was then placed back into the vial for the next step. Once all the milling was complete, the solid was suspended in water and placed into dialysis tubing. After several days in a recirculating deionized water bath, the suspension was removed from the dialysis tubing and dried via rotary evaporation. The oxygen content was determined to be about 11.60%.

Example 3

Lower surface area graphite (Grade 146) results in a product with less oxidation. About 1.0171 g of graphite (Grade 146) was milled stepwise with about 3 portions of about 1.3276 g of UHP (Alfa Aesar) for about 2 hours each. In between millings, the vial was filled with approximately 40 mL acetone and milled for about 1 minute to suspend the reaction mixture. This suspension was then transferred to a centrifuge tube and centrifuged at about 10,000 RPM for about 10 minutes. The solvent was then decanted off (the solid was allowed to dry) and was then placed back into the vial for the next step. Once all the milling was complete the solid was suspended in water and placed into dialysis tubing. After several days in a recirculating deionized water bath, the suspension was removed from the dialysis tubing and dried via rotary evaporation. The oxygen content was determined to be about 6.02%.

Example 4

A luminol test for peroxides shows the minimal milling times needed for full reaction of the UHP. The use of methanol as an intermediate solvent increases the efficiency of urea removal. About 1.0171 g of graphite (TC306) was milled stepwise with about 4 portions of about 0.9957 g of UHP (Alfa Aesar) for about 90 minutes, 60 minutes, 60 minutes, and then 30 minutes, respectively. In between millings, the vial was filled with approximately 40 mL methanol and milled for about 1 minute to suspend the reaction mixture. This suspension was then transferred to a centrifuge tube and centrifuged at about 10,000 RPM for about 10 minutes. The solvent was then decanted off (the solid was allowed to dry) and was then placed back into the vial for the next step. Small portions of the reaction mixture were removed to test with luminol between steps, and in all cases no light or bubbles were observed. Once all the milling was complete, the reaction mixture was once again processed with methanol, allowed to dry, suspended in water, and placed in dialysis tubing. After several days in a recirculating deionized water bath, the suspension was removed from the dialysis tubing and dried via rotary evaporation. The oxygen content was determined to be about 32.88%.

Example 5

The extent of oxidation can be increased by milling with more UHP. About 0.7568 g of product (oxidized graphite) with about 9.93 mass % oxygen was milled stepwise with about 4 portions of about 0.7411 g of UHP (Alfa Aesar) for about 90 minutes, 60 minutes, 60 minutes, and then 30 minutes, respectively. In between millings, the vial was filled with approximately about 40 mL of about a 50:50 methanol/acetone mixture and milled for about 1 minute to suspend the reaction mixture. This suspension was then transferred to a centrifuge tube and centrifuged at about 10,000 RPM for about 10 minutes. The solvent was then decanted off (the solid was allowed to dry) and was then placed back into the vial for the next step. Once all the milling was complete, the reaction mixture was washed about three times with about 50:50 methanol/acetone mixture and allowed to dry. The oxygen content was determined to be about 15.25%.

Example 6

Using a planetary mill allows scale up to be achieved. About 7.5147 g of graphite (TC306) was milled in one portion with about 30.0284 g of UHP (Alfa Aesar). Once all the milling was complete, the reaction mixture was suspended in water and placed in dialysis tubing. After several days in a recirculating deionized water bath, the suspension was removed from the dialysis tubing and dried via rotary evaporation. The oxygen content was determined to be about 14.47%.

Figure 3:
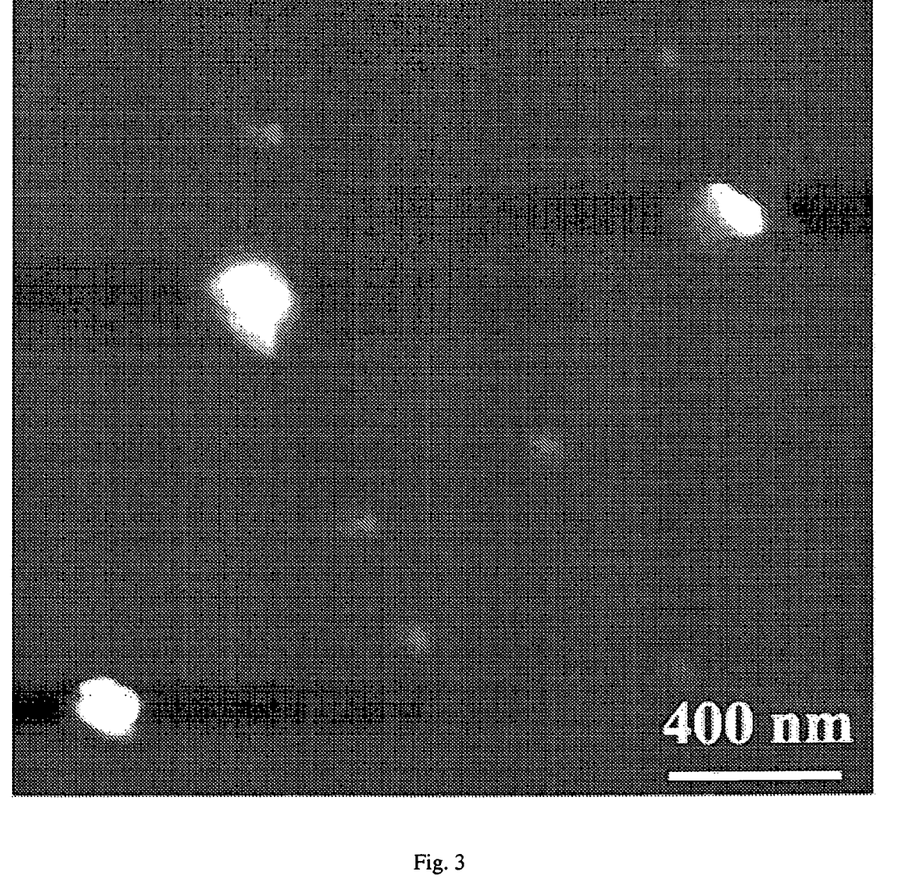
FIG. 3 is a scanning tunneling microscope image illustrating the size of the particles.

Film Preparation and Characterization:

Films were prepared by starting with a dilute suspension of the oxidized graphite in water and dropping onto a about 3.1 mm×about 25 mm gap between two layers of palladium deposited on a glass slide. The water was allowed to slowly evaporate. Electrical measurements were performed with a Zentech LCZ meter. FIG. 3 illustrates the size of the particles. These slides exhibited a transparency of 66%.

Figure 4:
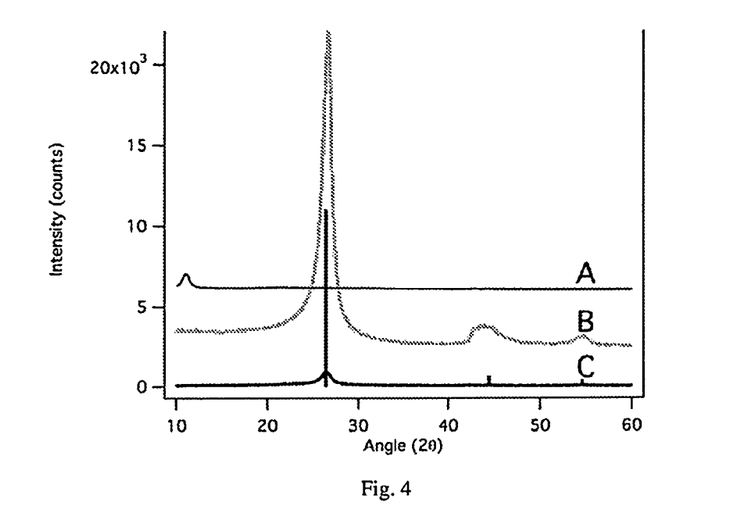
FIG. 4 is a graph illustrating powder X-ray diffraction.

X-ray Difraction:

As shown in FIG. 4, powder X-ray diffraction (XRD) was taken using a Rigaku Multiflex theta-theta powder X-ray diffractometer with a copper source (Cu K$\alpha\lambda$=1.5418). Spectra were collected from about 5 to 80 degrees 2$\theta$ using 0.010-degree steps and 0.3 seconds of dwell time.

Figure 2:
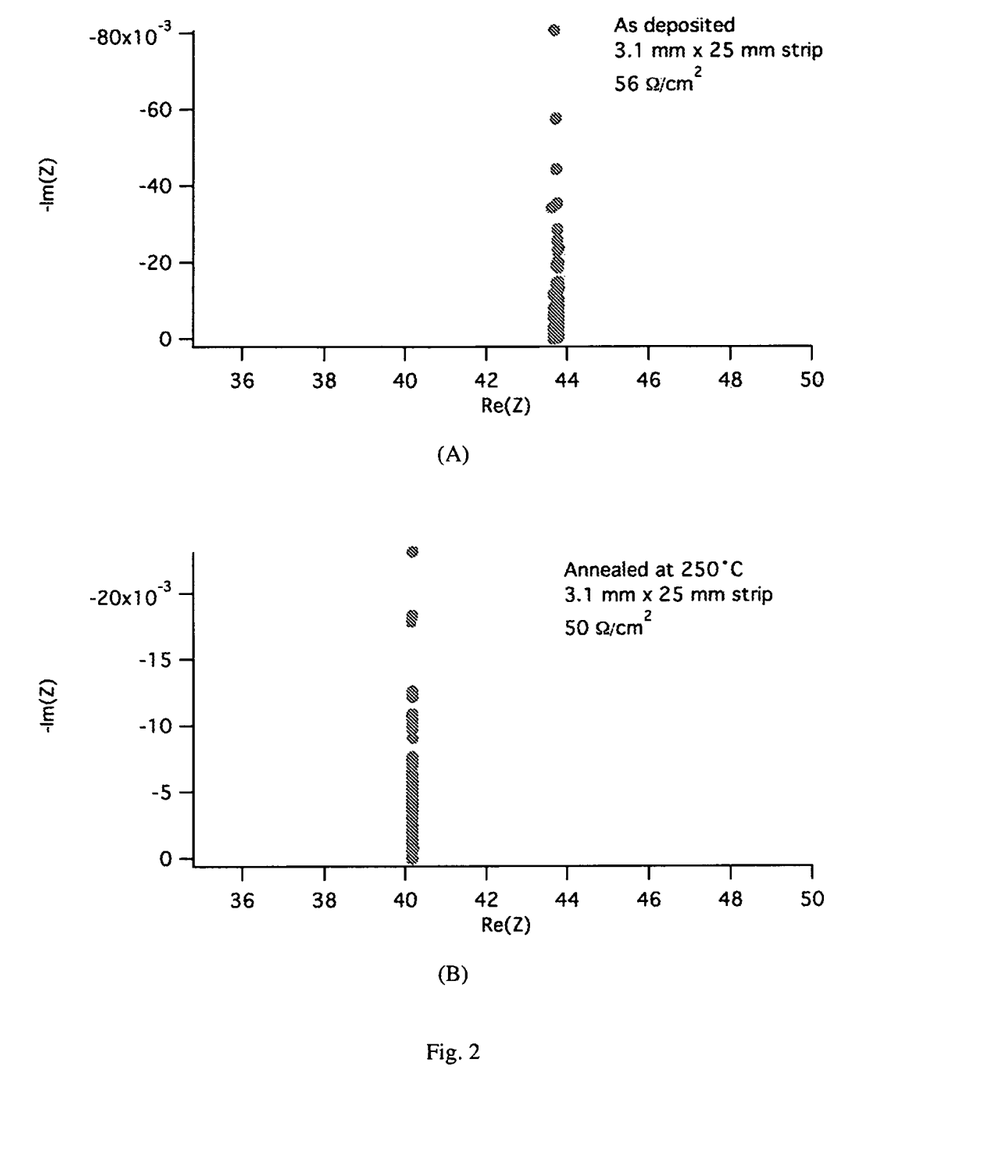
FIG. 2(A) illustrates Nyquist plots for thick films of oxidized graphite deposited by drop casting from water.
FIG. 2(B) depicts Nyquist plots for thick films of oxidized graphite deposited by drop casting from water after heating.

Electrical Characteristic:

Partial oxidation can allow graphite to retain some of its properties while taking on certain properties of graphite oxide. This has particular potential for application of graphite that requires the deposition of a film or use of colloidal graphite, which is difficult to achieve with graphite. Thin films of oxidized graphite were deposited by drop casting from water. Optically transparent (at least 66% transparent) films can be produced with a resistivity of about 8 k$\Omega$/cm$^2$. Thicker films can be produced with resistivities near about 50 $\Omega$/cm$^2$, as shown in FIG. 2. Transparency on regenerated cellulose was produced at at least 50% transparency.

Example 7

Carbon Fiber Production

In one embodiment, a fiber component and oxidized graphite is combined to form a fiber combination. The fiber combination is subjected to heat and a reducing atmosphere so as to reduce the oxidized graphite to graphite, forming a carbon fiber covered in graphite. In a particular embodiment, the fiber component includes rayon. In a further embodiment, the fiber component includes PVA, nylon, cotton, or polycarbonate. Pyrolysis under a reducing atmosphere such as hydrogen will result in fiber shrinkage and reduction of the oxidized graphite to graphite carbon fiber with a sheath of graphite results (FIG. 5), which exhibits enhanced mechanical properties. Other reducing atmospheres include hydrogen compounds and metal vapor.

Figure 5:
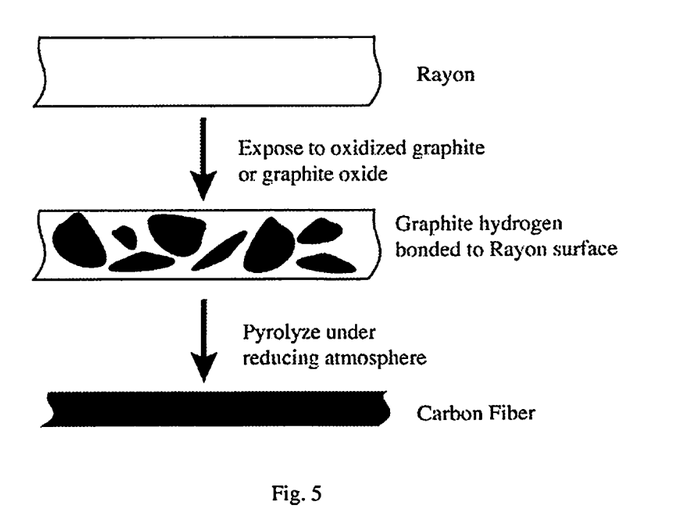
FIG. 5 is a display of a method of preparing a carbon fiber from a fiber component.
Figure 6:
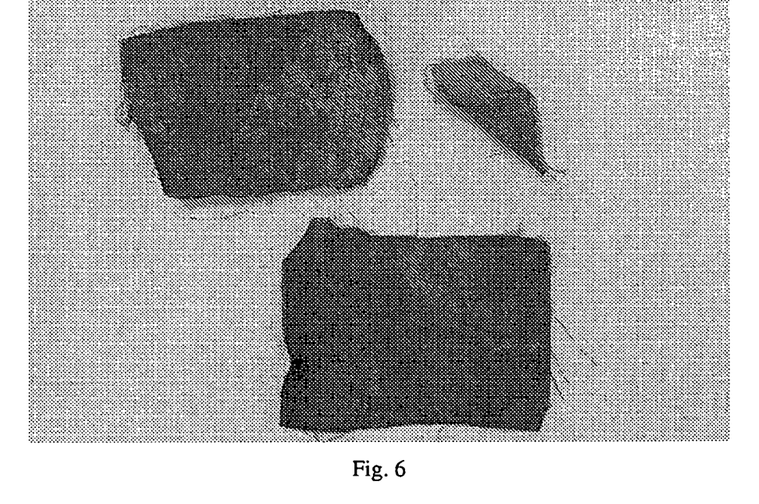
FIG. 6 is an example of fabric coated with oxidized graphite.

Rayon is a regenerated cellulose product, its surface consists of free —OH groups and ether linkages. Inventors have demonstrated the ability to coat rayon and sheets of transparent cellulose (FIG. 5). FIG. 5 presents a table illustration of a method of preparing a carbon fiber from rayon. The method includes coating rayon with oxidized graphite sheets and reducing it. The fiber shrinks due to fiber loss and the graphene sheets link in a uniform sheet of graphite under the reducing conditions. In a preferred embodiment, rayon fiber is soaked in a colloidal suspension of oxidized graphite prepared by the above-mentioned method, Hummer's methods, or another similar method, and a fiber coated in sheets of graphene is produced. After paralyses, under a reducing atmosphere such as hydrogen, the fiber will shrink and the oxidized graphite will be reduced to graphite. As a result, carbon fiber will be covered with a sheath of graphite. FIG. 6 shows an example of a few pieces of rayon fabric coated with oxidized graphite. The resulting product exhibits enhanced mechanical properties.

Figure 7:
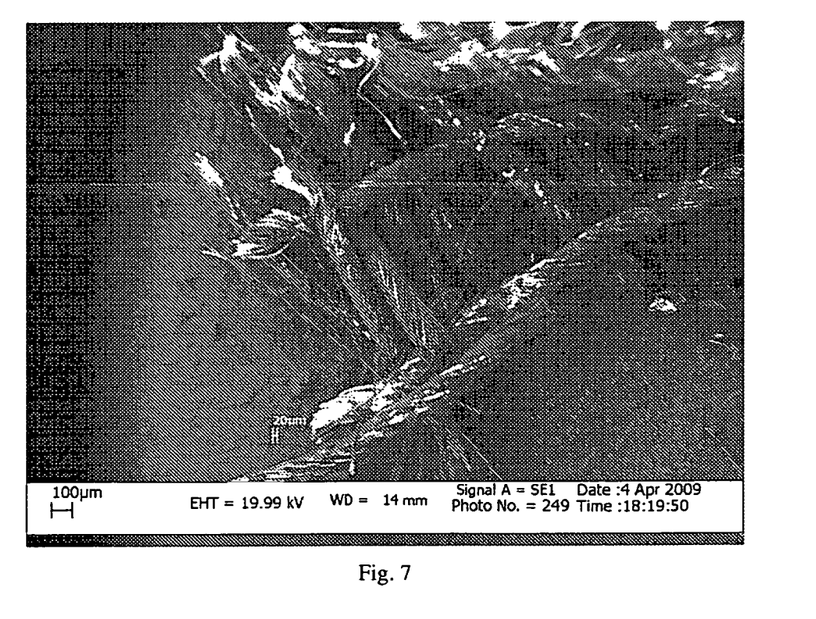
FIG. 7 is a Scanning Electron Microscopy (SEM) image of the fabric coated with oxidized graphite.
Figure 8:
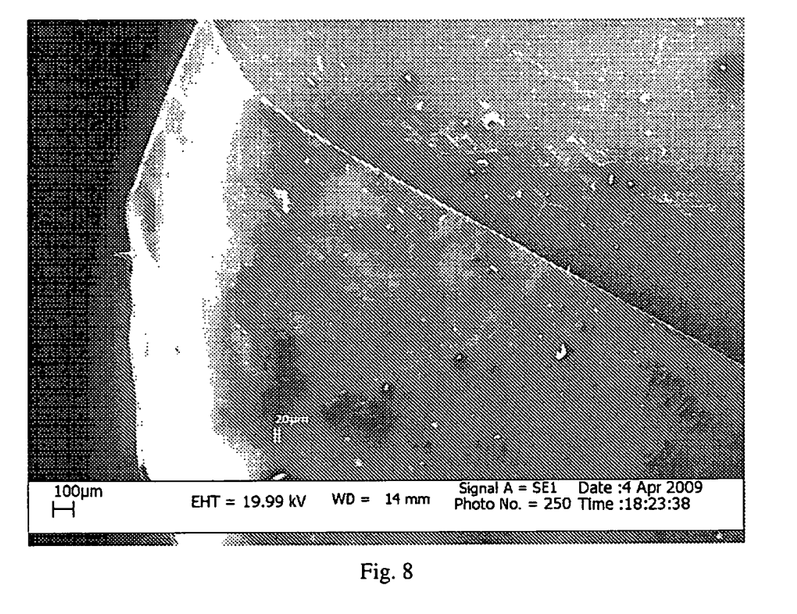
FIG. 8 is an SEM image of regenerated cellulose sheet uniformly coated with oxidized graphite.

FIG. 7 provides an image showing the coated rayon fabric, where most of the material has been uniformly coated with a conductive layer of oxidized graphite. FIG. 8 demonstrates that in an embodiment, an optically transparent regenerated cellulose sheet can be coated to produce a transparent, flexible, and conductive material.

In one embodiment, a method of producing oxidized graphite is provided. The method includes milling graphite powder directly with a solid oxidizing agent. In another embodiment, a method of producing partially oxidized graphite is provided, including milling graphite powder with a solid oxidizing agent. In a particular embodiment, the solid oxidizing agent is urea hydrogen peroxide (UHP).

In another embodiment, a method for preparing a carbon fiber is provided. The method includes milling graphite powder directly with a solid oxidizing agent to produce oxidized graphite. The method further includes subjecting a fiber component to the oxidized graphite, wherein the oxidized graphite binds to the fiber component. The method further includes introducing the oxidized graphite-bound fiber component to pyrolysis in a reducing atmosphere, wherein the oxidized graphite is reduced to graphite. In a further embodiment, following the milling step, the method includes suspending the oxidized graphite in water to form a colloidal suspension. In yet a further embodiment, the reducing atmosphere is a hydrogen atmosphere.

In another embodiment, a carbon fiber covered in graphite is provided. In a further embodiment, the carbon fiber includes increased tensile strength as compared to that of uncoated fibers. In a further embodiment, a carbon fiber is formed comprising a layer of graphene surrounding a fiber component core.

The term "Carbon fiber" as used herein refers to a fiber component covered in graphene.

The terms "covered" or "covered in", as used herein, relates to a fiber component wherein at least some portion of the fiber component is contacted by graphene.

The term "fiber component" as used herein relates to a substrate in fiber form (solid or tubular) onto which graphite may be deposited in accordance with the teachings herein. A non-limiting list of materials which a fiber component may comprise, includes, but is not limited to rayon, PVA, nylon, cotton, or polycarbonate.

In another embodiment, a method of producing a graphene covered surface is provided. The method includes depositing graphite oxide from a graphite oxide water suspension on a surface to form graphene layers on said surface. The method further includes subjecting the graphene layers to a reducing agent and heat, such that graphite is produced on the surface. In a particular embodiment, the reducing agent is hydrogen or a hydrogen compound. In another particular embodiment, the reducing agent is hydrazine. In another embodiment, a carbon fiber comprising a fiber component covered in graphene is provided. The carbon fiber is produced by combining a fiber component and oxidized graphite to form a fiber combination, and subjecting the fiber combination to heat and a reducing atmosphere so as to reduce the oxidized graphite to graphite and form the carbon fiber covered in graphene.

The term "Carbon nanotube" as used herein refers to a nanotube structure which comprises single or multiple sheets of graphene. Typically, one or more graphene sheets are rolled into a cylinder and the edges of the sheets are joined to form a tube. A nanotube can be comprised of a hollow cylinder of graphene in one embodiment. In an alternative embodiment, a nanotube may be formed of graphene with an amorphous carbon in the middle.

Carbon nanotubes can be formed in a variety of manners. In one particular embodiment, a fiber component (e.g., rayon), can be covered in oxidized graphite and subjected to heat in an oxidizing atmosphere to remove the fiber component. Higher temperature turns rayon into an amorphous carbon. In another embodiment, a polymer such as PVA may be used, such that when it is heated the middle vaporizes leaving a carbon nanotube shell remaining In order to remove the center, the nanotube may be heated in an oxidizing environment. Alternatively, the carbon nanotube may be subjected to a piranha bath or to plasma etching. A piranha bath, or piranha solution is also known as a piranha etch. The bath includes a mixture of sulfuric acid and hydrogen peroxide. Piranha baths are used to remove organic residue from substrates, because the combination of the solution provides a strong oxidizing environment. The piranha bath functions to hydroxylate (add OH groups) most surfaces and make them highly hydrophilic.

Alternatively, plasma etching is a technique in which a high-speed stream of plasma of an appropriate gas mixture is shot at a sample. As a result of the chemical reactions between the elements of the material being "etched" and the reactive species generated by the plasma, volatile etch products will be generated from the plasma at room temperature. The physical properties of the target will eventually be modified after the atoms of the shot element eventually embed themselves at or just below the surface of the target. In another embodiment, a carbon nanotube is provided, including a hollow cylinder of graphite. In a further embodiment, a method of making a carbon nanotube is provided, including combining a fiber component and oxidized graphite thereby forming a fiber combination. The method further includes subjecting the fiber combination to heat in a reducing atmosphere so as to reduce the oxidized graphite thereby forming a carbon fiber component covered in graphite. The method further includes heating the carbon fiber covered in graphite in an oxidizing environment at a temperature sufficient to convert the fiber component to amorphous carbon, or to vaporize the fiber component, thereby removing the fiber component to form a hollow carbon nanotube.

In yet a further embodiment, a carbon fiber covered in graphite is provided, the carbon fiber exhibiting an increased electrical conductivity as compared to that formed by a Hummers method. In a particular embodiment, the carbon fiber includes a conductivity of 50 $\Omega/cm^2$-1000 $\Omega/cm^2$.

In another embodiment, oxidized graphite with a ratio of 4-7 carbon atoms per hydrogen atom is provided. In a further embodiment, the oxidized graphite is hydrophilic. In a more particular embodiment, the oxidized graphite has a resistivity of 50 $\Omega/cm^2$-8000 $\Omega/cm^2$.

REFERENCES

1. Rasor, N. S. and J. D. McClelland, *Thermal properties of graphite, molybdenum and tantalum to their destruction temperatures*. Journal of Physics and Chemistry of Solids, 1960. 15(1-2): p. 17-26.
2. Hamwi, A. and V. Marchand, *Some chemical and electrochemical properties of graphite oxide*. Journal of Physics and Chemistry of Solids. 57(6-8): p. 867-872.
3. He, H., et al., *A new structural model for graphite oxide*. Chemical Physics Letters, 1998. 287(1-2): p. 53-56.
4. Lerf, A., et al., *Structure of Graphite Oxide Revisitedâ€*. The Journal of Physical Chemistry B, 1998. 102(23): p. 4477-4482.
5. Stankovich, S., et al., *Graphene-based composite materials*. Nature, 2006. 442(7100): p. 282-286.
6. Dikin, D. A., et al., *Preparation and characterization of graphene oxide paper*. Nature, 2007. 448(7152): p. 457-460.
7. Stankovich, S., et al., *Synthesis of graphene-based nanosheets via chemical reduction of exfoliated graphite oxide*. Carbon, 2007. 45(7): p. 1558-1565.
8. Geim, A. K., *The rise of graphene*. Nature Materials, 2007. 6(3): p. 183.
9. Hummers, W. S. and R. E. Offeman, *Preparation of Graphitic Oxide*. Journal of the American Chemical Society, 1958. 80(6): p. 1339-1339.
10. Marcano, D. C., et al., *Improved Synthesis of Graphene Oxide*. ACS Nano, 2010. 4(8): p. 4806-4814.
11. Paquette, M. S., T. D. Gregory, and S. T. Chen, *Process for manufacturing graphite oxide with purge of chlorine dioxide*. p. 29 pp.
12. Varma, R. S. and K. P. Naicker, *The Ureaâ^'Hydrogen Peroxide Complex:â€% ○Solid-State Oxidative Protocols for Hydroxylated Aldehydes and Ketones (Dakin Reaction), Nitriles, Sulfides, and Nitrogen Heterocycles*. Organic Letters, 1999. 1(2): p. 189-192.
13. Zielinska, A. and L. Skulski, *A solvent-free synthesis of (dichloroiodo)arenes from iodoarenes*. Tetrahedron Letters, 2004. 45(5): p. 1087-1089.
14. Benjamin C. Brodie (1859), *On the Atomic Weight of Graphite*. Proceedings of the Royal Society of London, volume 10, page 249.
15. Marcano et al. (2010) *Improved Synthesis of Graphene Oxide*. ACS Nano, web available on 21 Jul. 2010.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall there between. The teachings of all references herein, including patent related documents and scientific articles are incorporated herein in their entirety to the extent not inconsistent with the teachings herein.

What is claimed is:

1. A method of producing oxidized graphite, comprising the step of milling graphite powder directly with a oxidizing agent, wherein said oxidizing agent is a solid oxidizing agent.

2. The method of claim 1, wherein the solid oxidizing agent is urea hydrogen peroxide (UHP).

3. The method of claim 1, wherein said oxidized graphite produced has a ratio of 4-7 carbon atoms to a hydrogen atom.

4. The method of claim 1, wherein said oxidized graphite produced is hydrophilic.

5. The method of claim 1, wherein said oxidized graphite produced has a resistivity of less than 8000 $\Omega/cm^2$.

6. The method of claim 5, wherein said oxidized graphite has a resistivity of 50 $\Omega/cm^2$-8000 $\Omega/cm^2$.

7. A method of producing a graphene covered surface, comprising depositing oxidized graphite from an oxidized graphite water suspension on a surface to form graphene layers on said surface under conditions such that graphene is produced on said surface, wherein said conditions comprise subjecting the oxidized graphite on the surface to a reducing agent.

8. The method of claim 7, further comprising subjecting said graphene layers to a reducing agent and heat such that graphene is produced on said surface.

9. The method of claim 7, wherein the reducing agent is hydrogen or a hydrogen compound.

10. The method of claim 7, wherein the reducing agent is hydrazine.

11. Oxidized graphite, wherein said oxidized graphite has a ratio of 4-7 carbon atoms per hydrogen atom and wherein a carbon fiber covered in the oxidized graphite has a higher electrical conductivity as compared to that formed by a Hummers method, and wherein the oxidized graphite has a resistivity of less than 8000 $\Omega/cm^2$.

12. The oxidized graphite of claim 11, wherein said oxidized graphite is hydrophilic.

13. The oxidized graphite of claim 11 having a resistivity of 50 $\Omega/cm^2$-8000 $\Omega/cm^2$.

* * * * *